United States Patent [19]
Tress et al.

[11] Patent Number: 5,979,723
[45] Date of Patent: Nov. 9, 1999

[54] FASTENING ARRANGEMENT FOR ROOF RACKS

[75] Inventors: Andreas Tress, Bietigheim-Bissingen; Klaus Pfister, Maulbronn, both of Germany

[73] Assignee: Dr. Ing. h.c.F. Porsche AG, Weissach, Germany

[21] Appl. No.: 09/061,275

[22] Filed: Apr. 17, 1998

[30] Foreign Application Priority Data

Apr. 17, 1997 [DE] Germany .............................. 197 16 047

[51] Int. Cl.⁶ ...................................................... B60R 9/04
[52] U.S. Cl. .......................... 224/326; 224/309; 224/322; 224/329
[58] Field of Search .................................... 224/309, 321, 224/322, 325, 326, 327, 329, 330, 331

[56] References Cited

U.S. PATENT DOCUMENTS

| | | | |
|---|---|---|---|
| 3,473,773 | 10/1969 | Meyer | 224/309 X |
| 4,162,755 | 7/1979 | Bott | 224/326 |
| 4,165,827 | 8/1979 | Bott | 224/326 |
| 4,279,368 | 7/1981 | Kowalski | 224/309 X |
| 4,448,336 | 5/1984 | Bott | 224/309 |
| 4,768,691 | 9/1988 | Stapleton | 224/325 X |
| 4,911,348 | 3/1990 | Rasor et al. | 224/326 X |
| 5,314,104 | 5/1994 | Lee | 224/309 X |
| 5,636,776 | 6/1997 | Rak et al. | 224/325 X |
| 5,699,944 | 12/1997 | Duran | 224/309 X |
| 5,765,737 | 6/1998 | Cucheran et al. | 224/325 X |
| 5,782,392 | 7/1998 | Yamamoto | 224/326 |

FOREIGN PATENT DOCUMENTS

| | | | |
|---|---|---|---|
| 2672260 | 8/1992 | France | 224/329 |
| 31 51 405 | 7/1983 | Germany . | |
| 4320765 A1 | 1/1994 | Germany | 224/329 |
| 4004829 | 8/1991 | United Kingdom | 224/309 |

*Primary Examiner*—Gregory M. Vidovich
*Attorney, Agent, or Firm*—Evenson, McKeown, Edwards & Lenahan, P.L.L.C.

[57] ABSTRACT

Roof channels which extend in the longitudinal direction are constructed in laterally exterior regions on a vehicle roof of passenger cars. Fastening elements for fastening end-side carrier feet of roof racks are provided locally on the roof channels. A simple fastening for roof racks is provided on relatively narrow roof channels which allows high roof loads to be carried. Each roof rack has carrier feet which are constructed in one piece and are connected on the end side with transverse supports. The carrier feet have hollow lower end regions which are placed on projecting receiving regions of receiving adapters premounted on the roof channel and are connected therewith.

19 Claims, 7 Drawing Sheets

FASTENING ARRANGEMENT FOR ROOF RACKS

BACKGROUND AND SUMMARY OF THE INVENTION

This application claims the priority of German patent 197 16 047.6, filed Apr. 17, 1997, the disclosure of which is expressly incorporated by reference herein.

The invention relates to a fastening arrangement for a roof rack on a vehicle.

From German Patent Document DE 31 51 405 C2, a vehicle roof for a passenger car is known which has sunk roof channels extending in the longitudinal direction of the vehicle in laterally exterior regions, in the region of the roof channels, fastening arrangements being provided for the carrier feet of roof racks. In this arrangement, profiled holding rails are inserted in both roof channels and have a fastening web for a fastening in the roof channel and an upwardly extending web with an edge pointing to the outside for connecting a roof rack.

In this case, a supporting arm of the roof rack rests on the top side of the outwardly pointing edge, whereas a profiled clamping part is braced by means of a tightening screw against the underside of the edge and against the supporting arm. The tensioning screw is protected against theft by means of an additional lockable flap.

In this type of fastening for the roof rack, the roof channel, viewed in the transverse direction of the vehicle, must have a relatively large width in order to be able to introduce the bent clamping part into the roof channel. In addition, these carrier feet are suitable only for the absorption of a relatively low roof load. Each multi-part carrier foot formed by a supporting arm, a clamping part and a lockable exterior flap has a high-expenditure construction.

It is an object of the invention to provide a fastening for roof racks which has a simple construction on a vehicle roof with roof channels having a small width, in which case the roof racks can be mounted fast and easily and can also absorb high roof loads.

This and other objects have been achieved according to the present invention by providing arrangement for fastening a roof rack on a vehicle having longitudinally extending roof channels along laterally exterior sides of a roof, comprising: a receiving adapter to be premounted on the roof channel, said receiving adapter having a projecting receiving region; and a one-piece carrier foot connected to or integral with a transverse support of the roof rack, said one-piece carrier foot having a hollow lower end region to be placed on said projecting receiving region, said one-piece carrier foot being connectable to said receiving adapter.

This and other objects have been achieved according to the present invention by providing a receiving adapter for fastening a roof rack on a vehicle having roof channels extending in a longitudinal direction, said receiving adapter comprising: a supporting base to be aligned approximately parallel to a bottom of the roof channel in a mounted position; a plurality of supporting walls extending generally upward from said supporting base; a roof section extending between upper edges of the supporting walls; and a pair of supporting webs extending generally downward from said supporting base, said supporting webs being aligned in the longitudinal direction in the mounted position and arranged at a distance from one another to define a clearance therebetween.

The principal advantages achieved by the invention are that, as the result of the one-piece construction of the carrier feet and the arrangement of pre-mounted receiving adapters in the region of the roof channels, a simple fastening is achieved for the roof racks by means of which high roof loads can be implemented.

As the result of the interaction of the receiving adapter and the carrier foot which is form-locking in regions, a premounting of the roof rack already takes place when the roof rack is placed. The receiving adapter can be fastened in a simple manner with a single fastening screw on a hexagonal blind rivet nut anchored on the bottom of the roof channel or a suitable base plate (fastening element). The lower hollow end region of the carrier foot completely covers the upper receiving area of the receiving adapter which projects from the roof and the first fastening screw (protection against theft).

The support surfaces, which are arranged on the top side of the receiving adapter and are sloped symmetrically about the center axis, allow the receiving adapter to be used for the forward and for the rearward carrier feet as well as for the left and the right side of each roof rack. The lower edge of the carrier foot extends in a surrounding manner at a narrow distance from the vehicle roof situated underneath. Each carrier foot can be fastened via a second fastening screw accessible from above in a simple manner on the receiving adapter situated underneath.

For protecting the second fastening screw and the receiving element inserted into the groove of the transverse support against theft, a locking cap is used which in sections is pushed into the transverse support, is provided with a lock and covers an upper, laterally exterior supporting section of the carrier foot.

Other objects, advantages and novel features of the present invention will become apparent from the following detailed description of the invention when considered in conjunction with the accompanying drawings.

BRIEF DESCRIPTION OF THE DRAWINGS

FIG. 3 is an enlarged sectional view along Line III—III of FIG. 2 of the forward roof rack with;

DETAILED DESCRIPTION OF THE DRAWINGS

Figure 1:
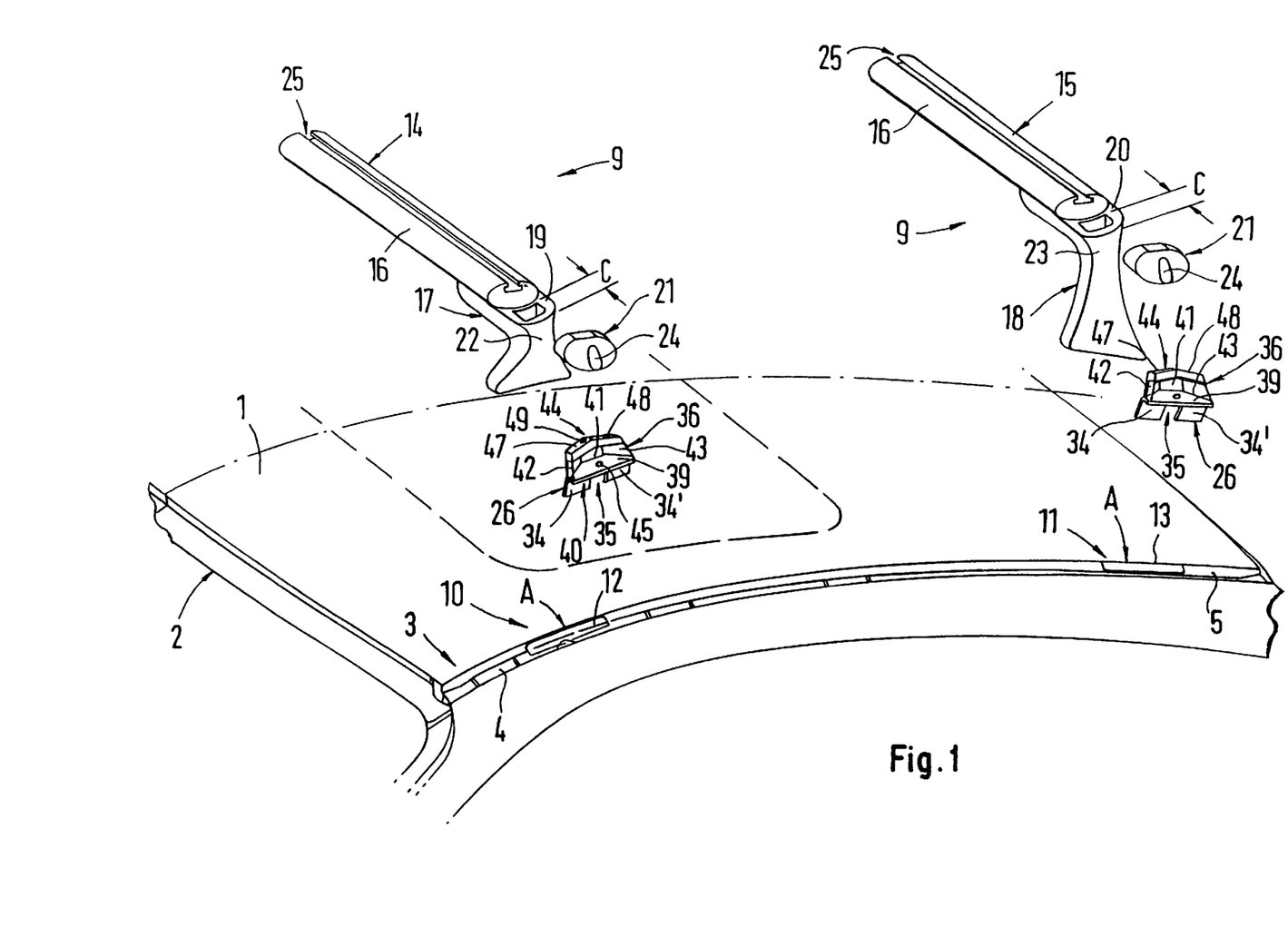
FIG. 1 is an exploded view illustrating a partial area of a vehicle roof and a roof rack according to a preferred embodiment of the present invention.
Figure 2:
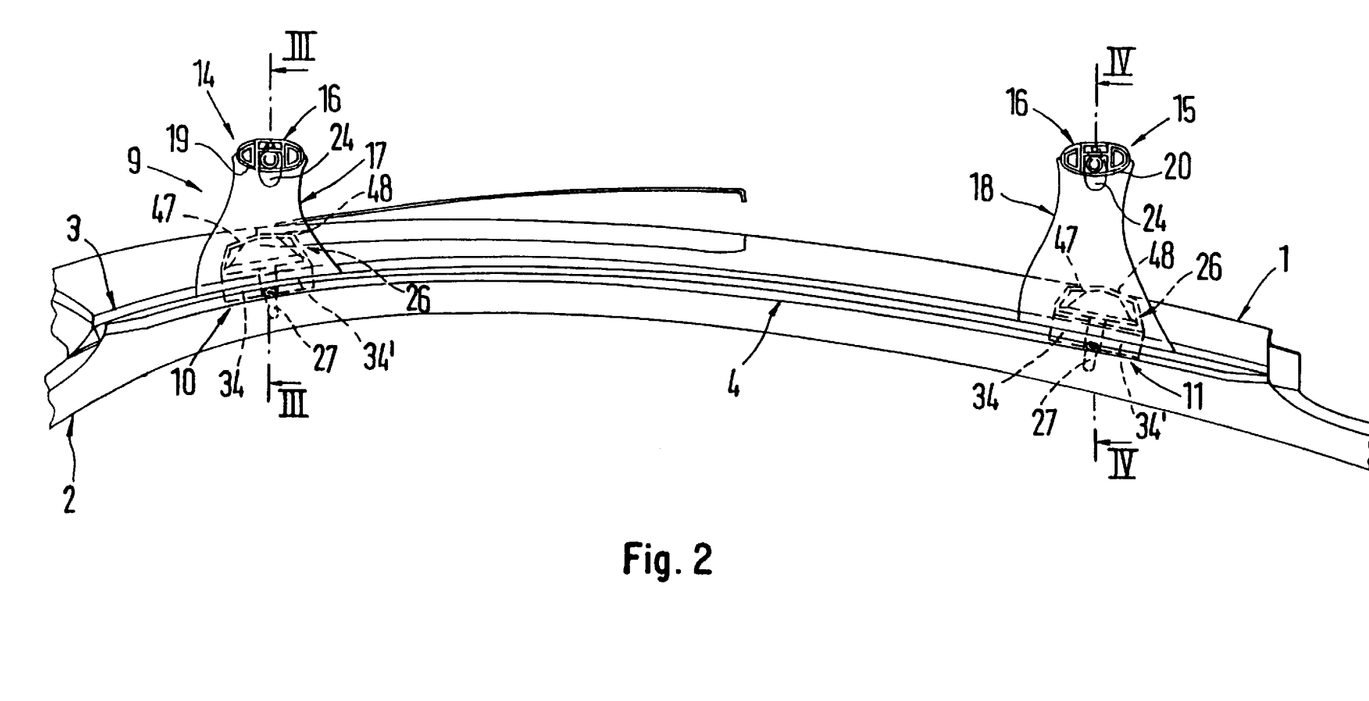
FIG. 2 is a partial lateral view of the vehicle roof and of the roof rack system.

A vehicle roof 1 for a motor vehicle 2, particularly for a passenger car, has, in laterally exterior regions 3, one sunk roof channel 4 respectively which extends in the longitudinal direction of the vehicle and which is closed in the upward direction by a cover strip 5. FIG. 1 illustrates the left half of the vehicle roof 1 and the respective roof channel 4. Each roof channel 4 extending along the whole length of the vehicle roof 1 has an approximately U-shaped profiled cross-section and is composed of a bottom 6 and two spaced upright lateral walls 7, 8. Locally, the vehicle roof 1 has a sliding or tilting roof (shown by a broken line in FIG. 1).

For fastening a roof rack system 9, displaceable flaps 12, 13 are provided on each cover strip 5 in a forward region 10 and in a rearward region 11, which flaps 12, 13 are constructed to be either slidable or foldable. In FIG. 1, the flaps 12, 13 are in their closed position A.

In the illustrated embodiment, the flaps 12, 13 can be displaced about an axis of rotation aligned in the longitudinal direction of the vehicle from the closed position A extending flush with the cover strip 5, into an upright open position B and vice-versa. According to FIG. 1, the roof rack system 9 consists of a forward roof rack 14 and a rearward roof rack 15.

Each of these two roof racks 14, 15 comprises a transverse support 16 which has an aerodynamically optimized cross-sectional form and which, on its two laterally exterior end regions, is connected with or is integral with carrier feet 17 and 18 constructed in one piece.

Figure 3:
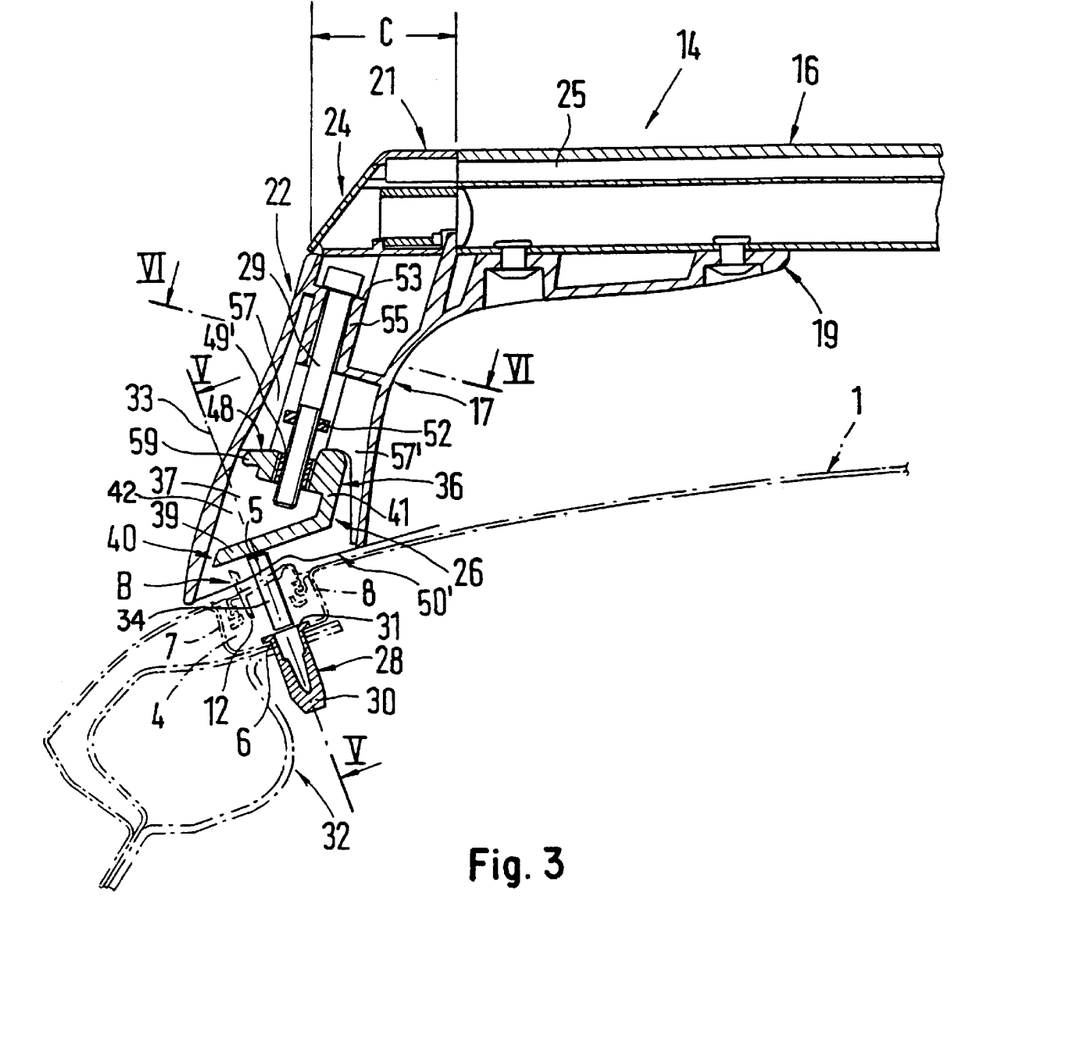
Figure 4:
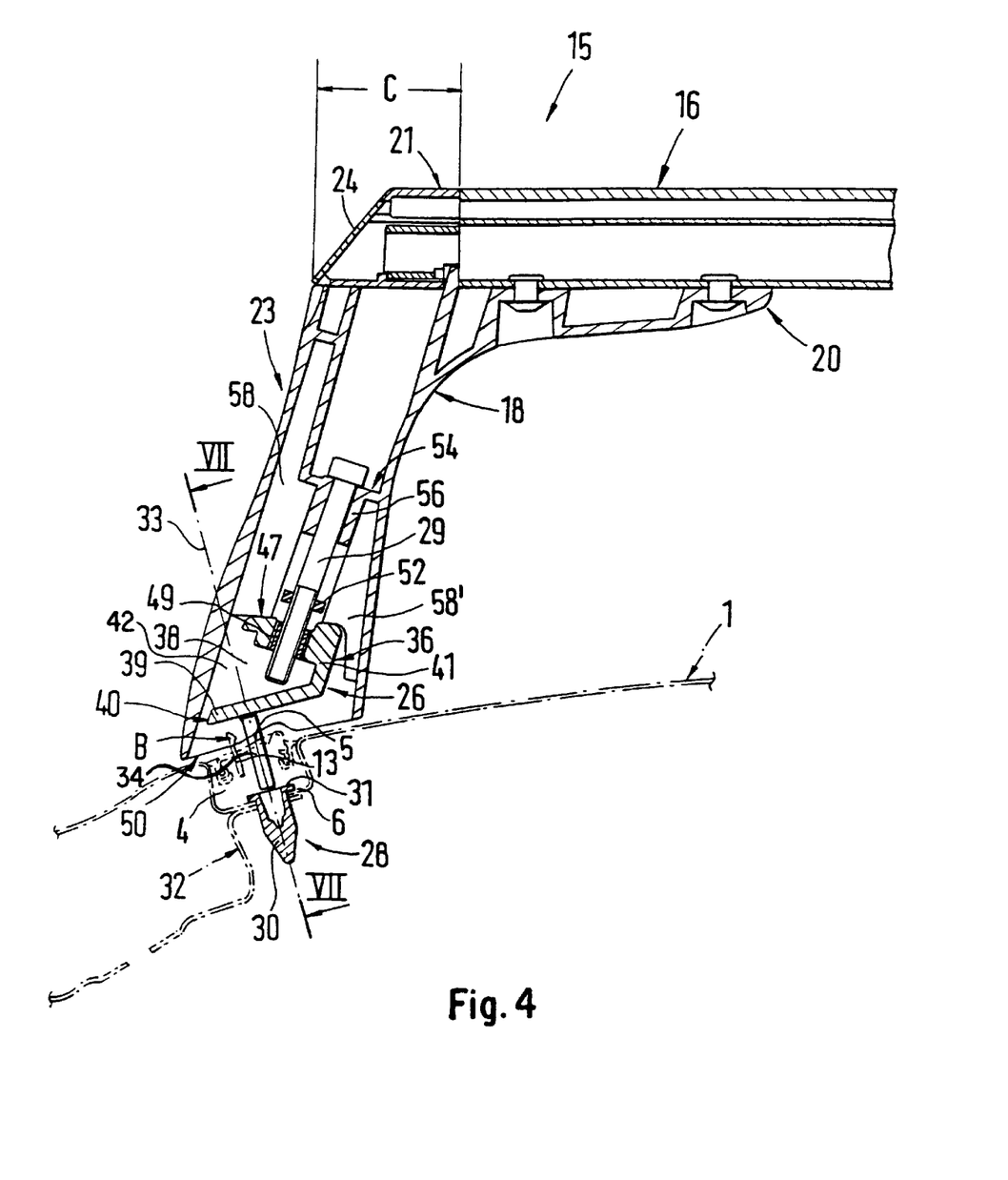
FIG. 4 is an enlarged sectional view along Line IV—IV of FIG. 2 of the rearward roof rack without fastner 27 shown.

Each end region of the transverse support 16 having an oval cross-sectional shape is situated in sections on a transversely extending supporting section 19, 20 of the corresponding carrier foot 17, 18, in which case, in this region, the connection between the two parts takes place by riveting, screwing or the like (see FIGS. 3 and 4). The supporting sections 19, 20 project beyond the transverse support 16 toward the exterior side by an extent C, end-side locking caps 21 being placed on this area which remains free. The locking caps 21 are fitted laterally in sections in the transverse support 16 and extend approximately flush with the exterior contour of the transverse support 16 and as an extension to the upright exterior contour 22, 23 of the carrier feet 17, 18. Each locking cap 21 comprises an integrated lock which is not shown in detail and which is accessible from the exterior side and is covered from the outside by a swivellable covering cap 24. In an upper region, the transverse support 16 has a longitudinally extending, continuous groove 25 in order to fasten holding devices on it, which are not shown in detail, for example skis, surf boards, bicycles or the like.

Figure 5:
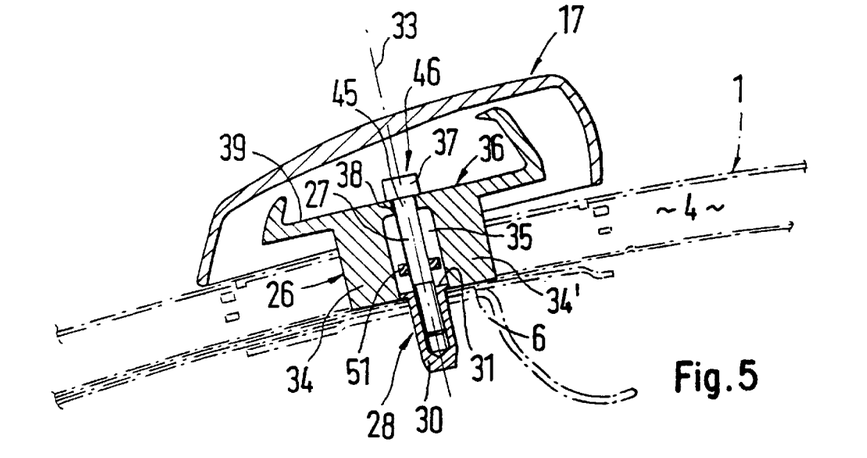
FIG. 5 is a sectional view along Line V—V of FIG. 3, showing an alternative embodiment of the receiving adapter 26 with longitudinally shorter supporting webs 34, 34' than the embodiment of the receiving adapter shown in FIG. 2, and additionally showing the first fastening crew 27.
Figure 6:
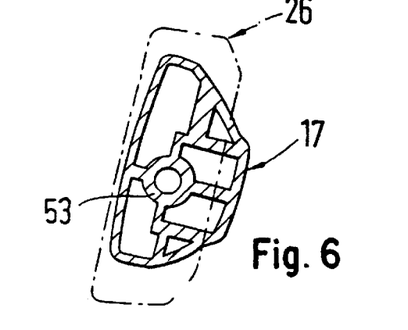
FIG. 6 is a sectional view along Line VI—VI of FIG. 3 without the second fastening screw 29 shown in FIG. 3.
Figure 7:
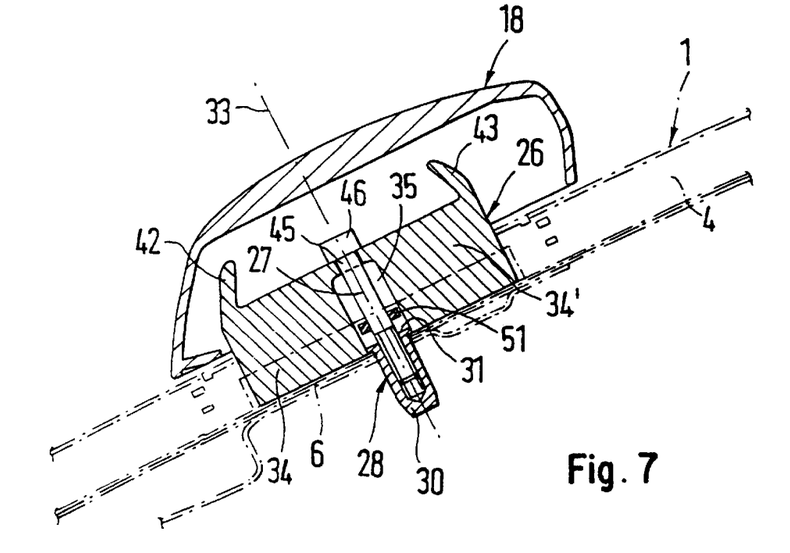
FIG. 7 is a sectional view along Line VII—VII of FIG. 4 and additionally showing the first fastening screw 27.

In the region of their carrier feet 17, 18, the forward roof rack 14 and the rearward roof rack 15 are connected in each case by a receiving adapter 26 with the vehicle roof 1. Each receiving adapter 26 is detachably connected on one hand by means of a first fastening screw 27 with a fastening element 28 arranged on the bottom 6 of the roof channel 4 (see FIGS. 5 and 7) and, on the other hand, is detachably connected by means of a second fastening screw 29 with the carrier foot 17, 18 (see FIGS. 3 and 4).

The fastening elements 28 are provided approximately in a center region of the longitudinal dimension of the flaps 12, 13. According to FIGS. 5 and 7, each fastening element 28 in the embodiment is formed by a hexagonal blind rivet nut 30 closed in the downward direction which is anchored on the bottom 6 of the roof channel 4. An end-side upper collar 31 of the hexagonal blind rivet nut 30 is supported on the top side of the bottom 6; whereas the essential portion of the hexagonal blind rivet nut 30 extends below the bottom 6 laterally next to a roof frame 32 in the direction of the passenger compartment and is covered by an interior roof frame covering which is not shown in detail. The hexagonal blind rivet nut 30, which is open toward the top, has a centric bore with an internal thread into which the first fastening screw 27 can be screwed. The upright center axis 33 of the hexagonal blind rivet nut 30 or of the First fastening screw 27 is aligned approximately at a right angle to the bottom 6 of the roof channel 4 and extends from the downward interior diagonally upward to the outside. Instead of the hexagonal blind rivet nut 30, the fastening element 28 may also be formed by a base plate which rests on the bottom of the roof channel and has a thread section or the like. The receiving adapters 26 can be fastened on the vehicle roof 1 only when the flap 12, 13 is folded up or pushed away.

According to the invention, the receiving adapter 26 is constructed such that it can be used for the forward carrier feet 17 as well as for the rearward carrier feet 18 and in each case for the left and the right side of each roof rack 14, 15 so that identically constructed receiving adapters 26 can be used for all four carrier feet 17, 18.

When the flap 12, 13 is open, each receiving adapter 26 reaches by means of at least one narrow, upright supporting web 34, 34' extending in the longitudinal direction of the roof channel 4 into the roof channel 4 and is supported on the top side of the bottom 6 of the roof channel 4.

In the illustrated embodiment, two supporting webs 34, 34' are provided which adjoin one another in an aligned manner in the longitudinal direction, a clearance 35 for the first fastening screw 27 being constructed between the supporting webs 34, 34'. The supporting webs 34, 34' extend away from the underside of the projecting receiving region 36 of the receiving adapter 26 extending above the vehicle roof 1. The supporting webs 34, 34' may extend to the longitudinal ends of the receiving adapter 26, as shown in cross-section in FIG. 7, or may be shortened to end at a distance from the longitudinal ends of the receiving adapter 26, as shown in cross-section in FIG. 5.

Hollow lower end regions 37, 38 of the carrier feet 17, 18 are placed on the projecting receiving regions 36 of the receiving adapters 26 and can be connected with these. The hollow lower end region 37, 38 of each carrier foot 17, 18 interacts at least in sections in a form-locking manner with the interior projecting receiving region 36 of the receiving adapter 26 and completely covers it and the first fastening screw 27, which protects against theft.

Figure 8:
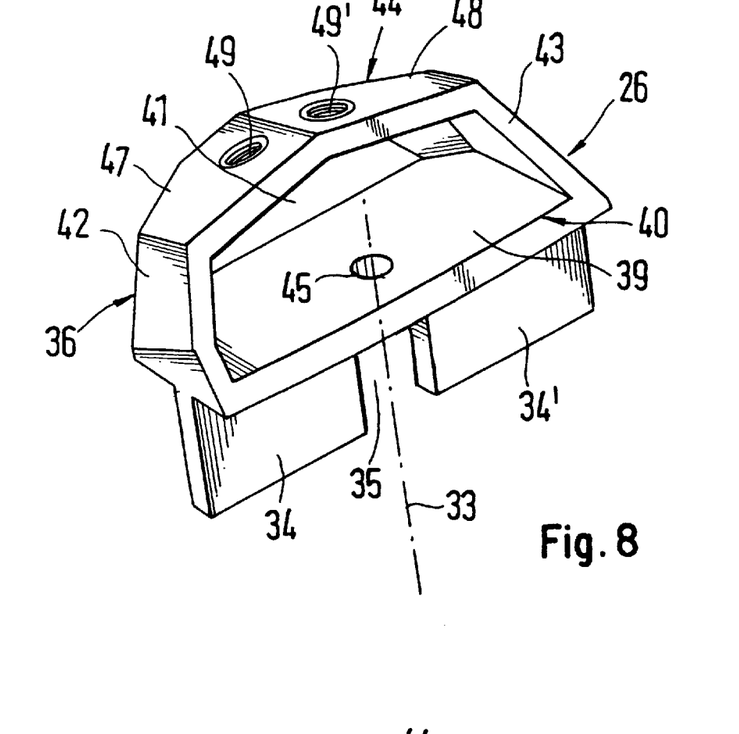
FIG. 8 is an enlarged perspective view of the receiving adapter diagonally from the front and outside.
Figure 9:
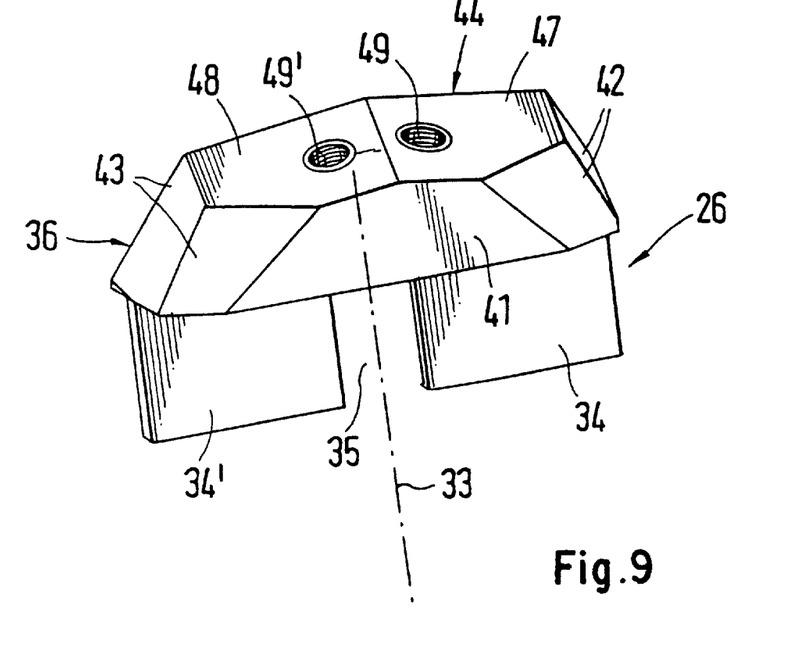
FIG. 9 is an enlarged perspective view of the receiving adapter from the inside.

The projecting receiving region 36 of the receiving adapter 26 comprises a lower support surface 39 which extends approximately in parallel to the bottom 6 of the roof channel 4, supporting walls 41, 42, 43, which are upright and adjoin one another, extending away from the support surface 39 on all sides with the exception of the exterior edge 40. The support walls 41, 42, 43 carry an upper roof section 44. The roof section 44, the supporting walls 41, 42, 43 and the support surface 39 form a recess-shaped hollow space (FIG. 8) which is accessible from the exterior side.

For the guiding-through of the first fastening screw 27, a bore 45 is constructed on the support surface 39, approximately in the center as viewed in the longitudinal direction of the vehicle which bore 45 is situated above the clearance 35. The first fastening screw 27 is supported by a head section 46 on the top side of the lower plane support surface 39. The support surface 39 reaches over the narrow support webs 34, 341 as viewed in the transverse direction of the vehicle, on both sides and specifically to the center of the vehicle sightly more than toward the outside.

Figure 10:
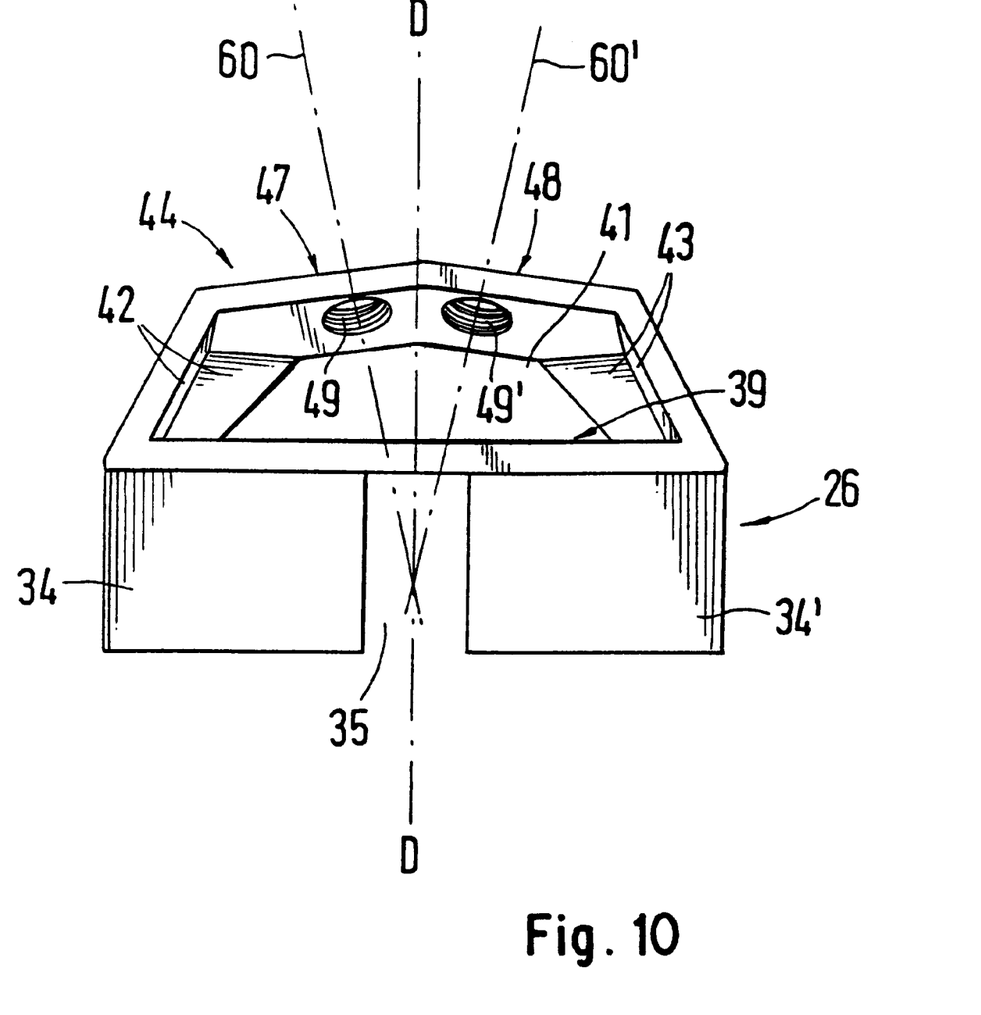
FIG. 10 is an enlarged view from the exterior side of the vehicle of the receiving adapter.

The upper roof section 44 of the receiving region 36 comprises two supporting surfaces 47, 48 which extend symmetrically to the center axis, in which case one threaded bush 49, 49' respectively with an internal-thread is provided on each supporting surface 47, 48 adjacent to the center axis. Each threaded bush 49, 49' is constructed approximately at a right angle to the corresponding supporting surface 47, 48 and can be swivelled for compensating tolerances. The upper edge o of the threaded bush 49, 49' is slightly sunk relative to the supporting surface 47, 48 situated above it. As the result of the two symmetrically sloped supporting surfaces 47, 48, the same receiving adapter 26 can be used for the forward carrier feet 17 as well as for the differently constructed rearward carrier feet 18. The plane of symmetry D—D of the receiving adapter 26 and the center axes 60, 60'0 of the threaded bushes 60, 60' are illustrated in FIG. 10, the center axes 60, 60' extending symmetrically to the plane of symmetry D—D.

In the illustrated embodiment, the receiving adapters 26 are formed by cast parts made of light metal or of a light metal alloy. However, the receiving adapters 26 may also be made of a fiberglass-reinforced synthetic material or any other material known in the art. The forward carrier feet 17 and the rearward carrier feet 18, in regions, have a different shape and vertical dimension. The carrier feet 17, 18 are also formed by cast parts made of light metal or of a light metal alloy, or any other material known in the art.

For fastening the forward roof rack 14, the second fastening screws 29, as viewed in the driving direction, are screwed into threaded bushes 49' situated in the rear; whereas, the fastening screws 29 for the rearward roof rack 15 are screwed into the threaded bushes 49 situated in the front. When the roof rack system 9 is mounted, the lower edge 50, 50' of the carrier feet 17, 18 extends at an approximately constant narrow distance from the vehicle roof 1 situated underneath; that is, the carrier feet 17, 18 rest only on the receiving adapter 26 and not on the vehicle roof 1. This excludes damage to the paint by relative movements during the driving operation.

The first fastening screw 27 is pre-mounted on the receiving adapter 26 and is secured against falling out by a rubber ring 51 placed on a threaded section. The outside diameter of the rubber ring 51 is slightly smaller than the width of the clearance 35. The second fastening screw 29 is pre-mounted on the carrier foot 17, 18 and is also secured against a falling-out by a fitted-on rubber ring 52. Several transversely extending upright reinforcing ribs (not shown in detail) and a supporting surface 53, 54 for the head of the second fastening screw 29 which is accessible from the top are provided on the carrier feet 17, 18 below the locking cap 21.

A hollow-cylindrical guiding section 55, 56 for the second fastening screw 29 extends in sections below the supporting region 53, 54. In the illustrated embodiment, downward-directed ribs 57, 57', 58, 58' which are arranged in a cross shape are connected to the exterior side of the guiding sections 55, 56, the lower end of the ribs being constructed such that a guide is formed for the roof section 44 of the inserted receiving adapters. In the longitudinal and transverse direction, the receiving adapter 26 is fixed in sections by the interior shape of the carrier foot 17, 18 so that only a slight displacement movement is possible between the carrier foot 17, 18 and the receiving adapter 26.

The fastening of the roof rack system 9 takes place in such a manner that, when the flaps 12, 13 are open, the four identically constructed receiving adapters 26 are inserted in the roof channel 4 and are fixed by screwing the fastening screws 27 into the assigned fastening elements 28. Subsequently, the two carrier feet 17 of the forward roof rack 14 and the carrier feet 18 of the rearward roof rack 15 are form-lockingly placed on the upwardly projecting receiving regions 36 of the receiving adapters 26 and are fixed from above with the second fastening screws 29. By subsequently laterally sliding in the locking caps 21 and locking the integrated locks, the second fastening screws 29 are covered so that they are protected against theft, so that a single lock per side and roof rack is sufficient for fastening the roof racks 14, 15 on the vehicle body and for protecting the receiving elements pushed into the groove 25. The second fastening screws 29 extend diagonally from the interior top downward to the outside. Both fastening screws 27, 29 have a cylindrical head with a hexagon socket.

The receiving adapters 26 may be powder-coated and, at least in the contact area on the bottom 6 of the roof channel 4, may have a paint-protecting elastic coating. The second fastening screws 29 have the same length respectively for the forward and rearward carrier feet 17, 18.

For this reason, the supporting region 54 on the rearward carrier feet 18, which have a larger height dimension than the forward carrier feet 17, is situated lower (FIG. 4) than the supporting region 53 on the forward carrier feet (FIG. 3). The outer edge 59 of the roof section 44 is offset with respect to the lower edge 40 of the supporting surface 39, which edge 40 projects farther to the outside, so that a wrench for socket head cap screws for operating the first fastening screw 27 can be introduced from above.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Arrangement for fastening a roof rack on a vehicle having longitudinally extending roof channels along laterally exterior sides of a roof, comprising:

a one-piece receiving adapter to be premounted on one of the roof channels, said receiving adapter including at least one supporting web extending downwardly from a supporting wall of said receiving adaptor, said at least one support web to be inserted into the roof channel and to be engaged with a bottom of the roof channel, said receiving adapter defining a bore for receiving a first connector for connecting said receiving adapter to the roof channel, said receiving adapter defining a threaded bush for engagement with a second connector, said receiving adapter having a projecting receiving region; and a one-piece carrier foot having a transverse support connected thereto or integral therewith, said one-piece carrier foot having a hollow lower end region to be placed on said projecting receiving region, said one-piece carrier foot defining an opening for receiving said second connector for connecting said carrier foot to said receiving adapter.

2. Arrangement according to claim 1, wherein the hollow lower end region of the carrier foot is configured to engage, at least in sections, form-lockingly with the projecting receiving region of the receiving adapter.

3. Arrangement according to claim 1, wherein the receiving adapter includes two of said supporting webs aligned in the longitudinal direction of the roof channel arranged at a distance from one another to define a clearance therebetween, said arrangement further comprising an upright first fastening screw acting as said first connector, said first fastening screw being engageable with a fastening element arranged on the bottom of the roof channel.

4. Arrangement according to claim 3, wherein the fastening element is one of a hexagonal blind rivet nut anchored on the bottom of the roof channel, and a fastening element which is closed in the downward direction.

5. Arrangement according to claim 1, wherein the at least one supporting web extends from an underside of the projecting receiving region of the receiving adaptor.

6. Arrangement according to claim 1, wherein the projecting receiving region is completely surrounded by the hollow lower end region of the carrier foot in a mounted position.

7. Arrangement according to claim 1, wherein a lower edge of the carrier foot is spaced at a distance from the vehicle roof in a mounted position.

8. Arrangement according to claim 3, wherein the first fastening screw has a head section which rests on a top side of a lower supporting surface of the projecting receiving region, said carrier foot covering the first fastening screw in a mounted position.

9. Arrangement according to claim 1, wherein said receiving adapter comprises:
  a plane supporting surface defined by said supporting wall to be aligned approximately parallel to a bottom of the roof channel in a mounted position;
  a plurality of supporting walls extending generally upward from said supporting surface; and
  a roof section extending between upper edges of the supporting walls,
  said at least one supporting web extending generally downward from said plane supporting surface,
  at least one of said roof section and said plurality of supporting walls forming said projecting receiving region.

10. Arrangement according to claim 9, wherein the roof section includes two supporting surfaces which extend mirror-symmetrically to a transverse plane of symmetry of the receiving adapter, each of said supporting surfaces defining a respective said threaded bush for engagement with a respective said second connector.

11. Arrangement according to claim 10, wherein the roof rack includes a forward roof rack and a rearward roof rack, each of said forward and said rearward roof racks including a right-side carrier foot and a left-side carrier foot, and wherein said receiving adapter is configured to be engaged with any of said carrier feet of either of the forward roof rack and the rearward roof rack.

12. Arrangement according to claim 11, wherein the carrier feet of the forward roof rack are fastenable to a rearward one of the threaded bushes via said second connectors, and the carrier feet of the rearward roof rack are fastenable to a forward one of the threaded bushes via said second connectors.

13. Arrangement according to claim 12, wherein the second connector is accessible from the top side of the carrier foot and the receiving adapter is inserted into an upper groove of the transverse support and is protected against theft by a locking cap which is pushed in sections into the transverse support.

14. Arrangement according to claim 1, wherein at least one of the receiving adapter and the carrier foot is a cast part made of a material selected from the group consisting of a light metal and a light metal alloy.

15. Arrangement according to claim 9, wherein said threaded bush is defined in said roof section.

16. Arrangement for fastening a roof rack on a vehicle, comprising:
  a receiving adapter to be premounted on a roof channel on the roof of a vehicle, said receiving adapter comprising:
  a plane supporting surface to be aligned approximately parallel to a bottom of the roof channel, said plane supporting surface defining a bore for receiving a first connector for connecting the receiving adapter to the roof channel,
  at least one supporting web extending generally downward from said supporting surface to be engaged with a bottom of the roof channel,
  a plurality of supporting walls extending generally upward from said supporting surface,
  a roof section extending between upper edges of the supporting walls, said roof section defining a threaded bush for engagement with a second connector,
  said roof section and said plurality of supporting walls forming a projecting receiving region; and
  a carrier foot having a hollow lower end region to be placed on said projecting receiving region, said carrier foot defining an opening for receiving said second connector.

17. An arrangement according to claim 16, wherein said receiving adapter is one-piece.

18. An arrangement according to claim 16, wherein said carrier foot is one-piece.

19. An arrangement according to claim 17, wherein said carrier foot is one-piece.

* * * * *